Figure 1:
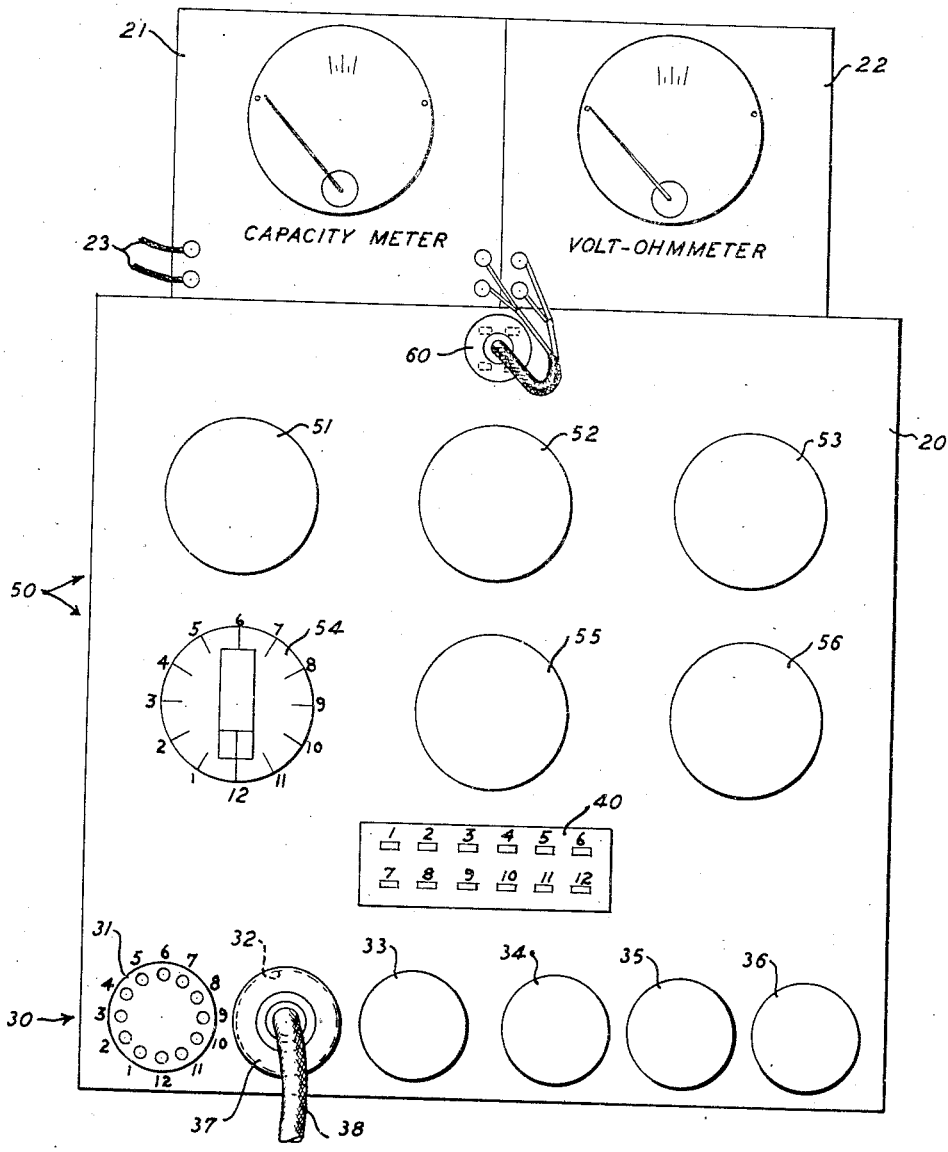
Figure 1:
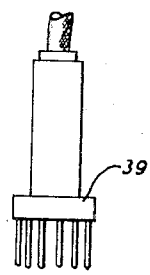

Nov. 12, 1940.                J. L. ROEMISCH                2,221,556
                      ELECTRICAL CONNECTOR APPARATUS
                         Filed Jan. 15, 1938         2 Sheets-Sheet 1

INVENTOR
J. L. ROEMISCH
BY
E. R. Nowlan
ATTORNEY

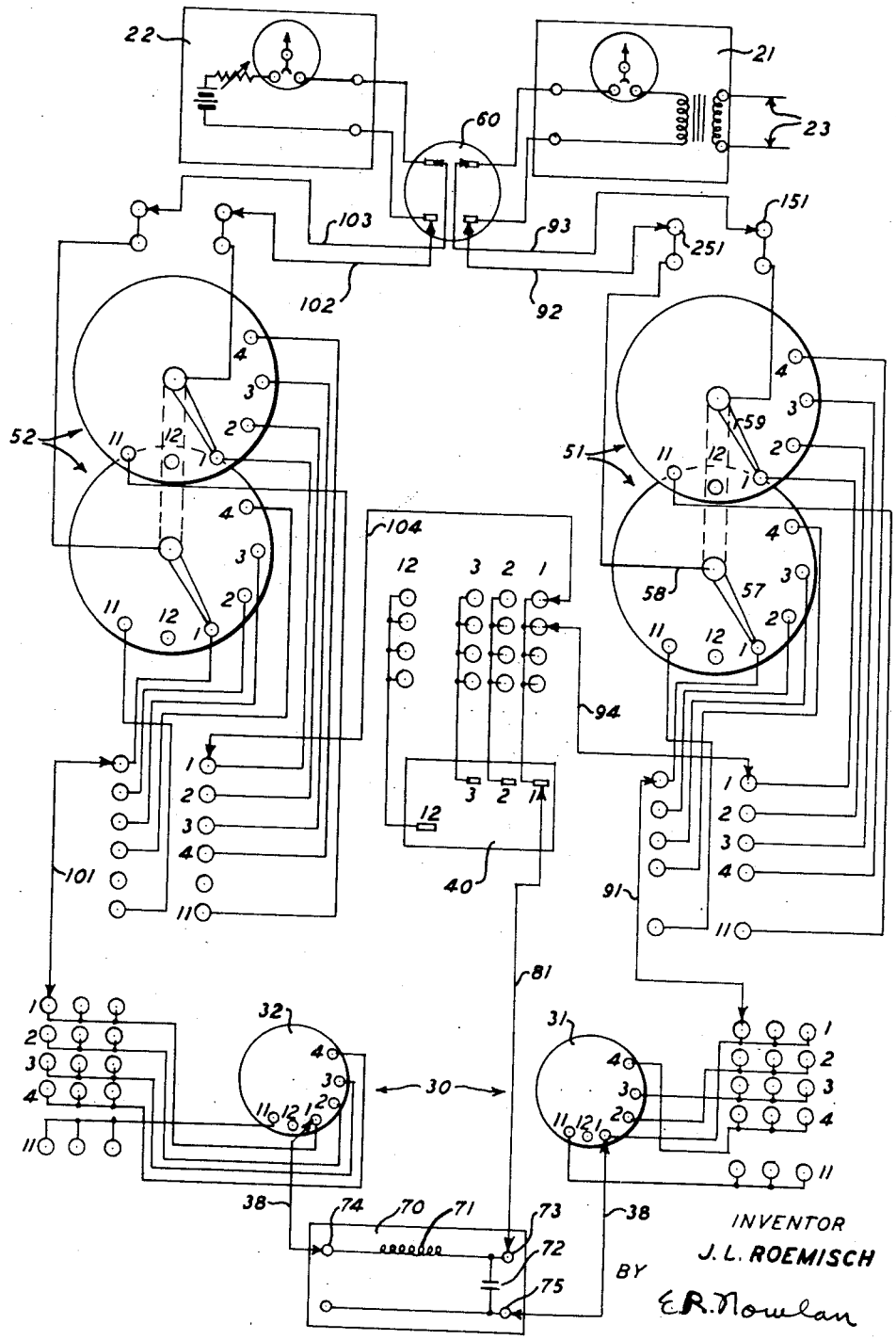

Patented Nov. 12, 1940

2,221,556

BEST AVAILABLE COPY

UNITED STATES PATENT OFFICE 2,221,556

ELECTRICAL CONNECTOR APPARATUS

Joseph L. Roemisch, Lyndhurst, N. J., assignor to Western Electric Company, Incorporated, New York, N. Y., a corporation of New York Application January 15, 1938, Serial No. 185,248

6 Claims. (Cl. 175—183)

This invention relates to an electrical connector apparatus and more particularly to a connector apparatus for use in testing electrical apparatus.

In the manufacture of electrical apparatus comprising a complex plurality of electrical elements, such apparatus, for example, as radio transmitting sets, radio receiving sets, and the like, it may happen that a considerable number of individual apparatus, all identically similar, is to be manufactured, and then another lot of analogous apparatus, whose complex internal circuits, all identically like each other, differ from those of the first plurality, is to be assembled. The circuits of each individual apparatus when completed must be tested in a variety of ways to be certain that all connections are properly made, that no undesired short circuits or other electrical leakage exist, that each component is of the prescribed electrical characteristics and value, etc. For such testing it is desirable to temporarily connect a voltmeter, an ohmmeter, a capacity meter, or perhaps other like electrical measuring devices, in turn or simultaneously, into or across parts of the circuits in question. For each group of apparatus, identically alike among themselves, there will be a definite pattern partly of successive and partly of simultaneous testing connections to be made, which pattern will be the same for the apparatus of one such group, but will be more or less different for analogous apparatus of another group.

An object of the present invention is to provide a single, relatively simple and easily operable apparatus for setting up a temporarily permanent plexus, system or web of electrical circuits, whereby a complex electric circuit to be tested in a multiplicity of ways may have its various elements and constituent sub-circuits connected at will to one or more suitable electrical measuring devices, the apparatus of the invention remaining unchanged throughout the testing of a plurality of apparatus of one kind and being easily modifiable as to its plexus of circuits for application to individuals of a group of apparatus of another kind.

With the above and other objects in view, one embodiment of the invention may present a plurality of multiple contact plugs or sockets or the like, as incoming terminals for connection by means of appropriate cords to the vacuum tube sockets of a radio apparatus, together with one or more electrical measuring devices connectible, by means of a group of multiple contact switches, at will to any two of an array of plug or jack terminals, in combination with a set of interchangeable cords to connect the array of terminals in any desired, temporarily permanent but alterable, pattern or plexus with the terminals of the first mentioned plurality of contact plugs or sockets.

Other objects and features of the invention will appear from the following detailed description of one embodiment thereof taken in connection with the accompanying drawings in which like reference numerals are applied to identical parts in the several figures and in which Fig. 1 is a partly diagrammatic view in front elevation of an electrical connector apparatus constructed in accordance with the invention; and Fig. 2 is a wiring diagram of part of the apparatus as connected to a simple and illustrative electrical circuit to be tested.

In the embodiment of the invention as herein described, a combination housing and framework of any suitable structure and material has a preferably rectangular front wall or panel 20, and upon its upper surface is supported, in the present instance, a capacity meter 21 and a volt-ohm-meter 22, both of any appropriate construction, the capacity meter being fed with operating current from any suitable outside source through conductors 23.

As shown, there is mounted in the lower part of the panel 20, a plurality 30 (here six) of multiple contact sockets 31, 32, 33, 34, 35 and 36, all identically alike and each adapted to receive a multiple prong plug. These sockets are here shown as having twelve contacts each. Each ordinarily has one dead or non-conductive terminal.

Above these six multiple sockets, there is mounted in the panel 20 a set 40 of twelve (as here shown) individual single contact sockets.

The sockets of the plurality 30 are intended to receive corresponding plugs such as 37, each connected to a multiple conductor cord 38 provided at its other end with a similar plug 39. This last plug 39 is intended to be inserted into one or another of the tube sockets of a radio apparatus or the like which is to be tested, and the plug 39 will be provided with as many contact prongs, up to eleven in the present instance, as the tube socket in question is made to receive. The number is one less than the number of contacts in the socket 32, because the latter has one dead terminal for safety reasons.

Above the socket group 40, there is mounted in the panel 20 a group or plurality 50 of rotary switches 51, 52, 53, 54, 55 and 56, each of twelve positions of which one is dead or electrically inactive. Each of these switches, as indicated diagrammatically in Fig. 2, is duplex, having two contact arms and two sets of twelve contacts each to correspond. Each contact of each of these switches has a socket terminal to receive a single contact plug, and these terminals open on the rear face of the panel 20.

In like manner, each externally accessible socket of each of the multiple sockets 30 and of the set 40 has a corresponding internally accessible single contact socket connected thereto.

In Fig. 2, the exterior socket contacts of multiple sockets 31 and 32 are shown within the circles which represent them, while the corresponding interior socket terminals are shown grouped to the right and left of these two circles respectively; the external terminals of the group 40 are shown within the rectangle and the corresponding internal sockets grouped in array above this rectangle, and the contacts for the switch arms of the switches 51 are shown within the twin circles representing the switches, while the corresponding sets of terminals are shown in double row vertical arrays below the twin circles, all of the structure of these switches being within the panel 20 except the manipulating bars and the dials on the front face of the panel.

At the top of the front face of the panel 20 is exposed a four contact socket 60, into which are connected the terminals of the removable and interchangeable meters 21 and 22, the apparatus as shown being designed to operate with two meters simultaneously, although it may well be constructed for more or less. Thus the meters in use at any time may be readily interchanged for others of different range and the same character or for others of different character.

To illustrate the use of the apparatus, an electrical device 70 of the simplest character (shown only in Fig. 2) is thought of as connected to the apparatus. This device 70 comprises a coil 71 and a condenser 72 connected in the arms of a Y circuit, to have a common terminal at 73 and an individual terminal each at 74 and 75 respectively.

For this purpose there will be two cords 38, each with the usual twelve prong plug 37 and a one prong plug at 39. One such cord is to have its plug 37 in the socket 31 and its plug 39 in the terminal 75. The other cord 38 is to have its plug 37 in the socket 32 and its plug 39 in the terminal 74. Let it be assumed that the conductor of the cord runs from the one prong of the plug 39, in each case, to that prong of the plug 37 which is to enter the contact numbered 1 of the socket 31 or 32 as the case may be. An auxiliary cord 81 having suitable plug ends is to be connected from the terminal 73 to one of the sockets of the group 40, say the one numbered 1. Thus all the connections necessary to test the device 70 will be made to the apparatus plugging in the three connections 38, 38 and 81 on the front face of the panel 20.

Turning now to the rear face of the panel 20, an auxiliary cord 91 is plugged in from one of the triplicate (electrically parallel) rear terminals of the contact 1 of the plug 31, to the terminal of the contact 1 of the lower disk of the duplex rotary switch 51. The lower rotary arm 57 of this switch is permanently connected by a lead 58 to the switch terminal 251. An auxiliary cord 92 is plugged in from the terminal 251 to one of the contacts of the socket 60 which is connected as already described to one terminal of the capacity meter 21. Another auxiliary cord 93 is plugged in, from that contact of the socket 60 connected to the second terminal of the capacity meter, to the terminal 151 of the switch 51 permanently connected to the upper arm 59 of the switch. The contact numbered 1 of the upper disk of the switch 51 has its terminal then connected by an auxiliary cord 94 to one of the quadruplicate (electrically parallel) rear terminals of the socket 1 of the group 40 and another terminal of the same quadruplicate set of the socket 1 of the group 40 is connected by an auxiliary cord 104 to the terminal of the contact 1 of the upper disk of the duplex rotary switch 52. Another auxiliary cord 102 connects the upper arm of this switch through the socket 60 to one terminal of the volt-ohmmeter 22. The other terminal of the meter 22 is connected through the socket 60 by an auxiliary cord 103 to the lower arm of the switch 52, and, finally, an auxiliary cord 101 is plugged in to connect the rear terminal of the contact 1 of the lower disk of the switch 52 to one of the triplicate (electrically parallel) rear terminals of the contact 1 of the socket 32.

The terminals connected to the contacts of the sockets 31, 32, 33 etc. are made triplicate and those of the sockets of the group 40 are made quadruplicate to permit of such multiple connections as are illustrated in the present instance in the case of the socket 1 of the group 40 which is connected to both the auxiliary cords 94 and 104. In the case where a much more complex apparatus or device than that illustrated at 70 is to be tested it will frequently be desirable to make several or many such double, triple or even quadruple connections at one or another contact of the sockets 30 and 40.

The device 70 is now so connected to the apparatus, by plugging in the cords 38, 38 and 81 as described, and the electrical elements of the apparatus are so connected to each other, that a series of tests of the device 70 may be made merely by turning the arms of the switches 51 and 52 to lie one at a time or simultaneously on the contacts 1 of the switches. There being a plurality of devices 70 to be tested, the particular device 70 is removed by simply unplugging the outer ends of the cords 38, 38 and 81, and another connected.

So long as the auxiliary cords 91, 92, 93, 94, 101, 102, 103 and 104 are allowed to remain as shown, the apparatus can be used to test devices electrically like the device 70. Now if a record be made and preserved of the connection pattern of these six auxiliary cords, the apparatus can be set up to test devices such as 70, even by an operator totally ignorant of electrical theory. He simply plugs in the six cords in the indicated pattern, plugs the three cords 38, 38 and 81 into the devices to be tested, one after the other, turns the switches 51 and 52, and reads the meters. The required pattern of connections of the auxiliary cords on the rear face of the panel 20 can be set up, generally speaking, from such a record, in less time than a simple device 70 can be connected, disconnected, re-connected, and tested in the ordinary manner with meters 21 and 21. And when the apparatus has been thus interconnected a considerable plurality of devices 70 can be tested in the time needed for one device only by the ordinary method. This discrepancy increases with the complexity of the device to be tested, and it is safe to say that in the case of a fairly complex radio receiving device, where the pattern of interconnections is a matter of record, a hundred similar devices can be tested, including the time required to set up the auxiliary cord pattern, in the time required to test one device in the ordinary manner.

There is also the further advantage, that once the cord pattern is set up, no accidental oversight or forgetfulness can cause a test, e. g. for unwanted short circuits, to show an acceptable result because a connection is forgotten.

The invention is, of course, not limited to the specific embodiment used to illustrate it, which may be variously modified and departed from without departing from the spirit and scope of the invention as pointed out in and limited solely by the appended claims.

What is claimed is:

1. In an apparatus for electrical testing a plurality of multiple contact sockets, a multiple terminal for each contact of each socket to permit plural connection to each such contact, and a plurality of multiple contact switches, in combination with a plurality of removable and interchangeable connectors, the elements being so constructed, proportioned and arranged that any desired pattern of interconnection may be set up with the connectors between the individual terminals of the contacts of the sockets and the individual contacts of the switches.

2. In an apparatus for electrical testing a plurality of multiple contact sockets, a multiple terminal for each contact of each socket to permit plural connection to each such contact, a plurality of multiple contact switches, and a plurality of electrical measuring devices, in combination with a plurality of removable and interchangeable connectors, the elements being so constructed, proportioned and arranged that any desired pattern of interconnection may be set up with the connectors between the individual terminals of the contacts of the sockets and the individual contacts of the switches, and between the individual contacts of the switches and the terminals of the measuring devices.

3. In an apparatus for electrical testing a plurality of multiple contact sockets, a multiple terminal for each contact of each socket to permit plural connection to each such contact, a plurality of multiple contact switches, and a plurality of removable and interchangeable electrical measuring devices, in combination with a plurality of removable and interchangeable connectors, the elements being so constructed, proportioned and arranged that any desired pattern of interconnection may be set up with the connectors between the individual terminals of the contacts of the sockets and the individual contacts of the switches, and between the individual contacts of the switches and the terminals of the measuring devices.

4. In an apparatus for electrical testing a plurality of multiple contact sockets, a multiple terminal for each contact of each socket to permit plural connection to each such contact, a plurality of multiple contact switches, and means to supply electric current to the switches, in combination with a plurality of removable and interchangeable connectors, the elements being so constructed, proportioned and arranged that any desired pattern of interconnection may be set up with the connectors between the individual terminals of the contacts of the sockets and the individual contacts of the switches.

5. In an apparatus for electrical testing a plurality of multiple contact sockets, a multiple terminal for each contact of each socket to permit plural connection to each such contact, a plurality of multiple contact switches, a plurality of electrical measuring devices, and means to supply electric current to the switches and to the measuring devices, in combination with a plurality of removable and interchangeable connectors, the elements so constructed, proportioned and arranged that any desired pattern of interconnection may be set up with the connectors between the individual terminals of the contacts of the sockets and the individual contacts of the switches, and between the individual contacts of the switches and the terminals of the measuring devices.

6. In an apparatus for electrical testing a plurality of multiple contact sockets, a multiple terminal for each contact of each socket to permit plural connection to each such contact, a plurality of multiple contact switches, a plurality of removable and interchangeable electrical measuring devices, and means to supply electric current to the switches and to the measuring devices, in combination with a plurality of removable and interchangeable connectors, the elements being so constructed, proportioned and arranged that any desired pattern of interconnection may be set up with the connectors between the individual terminals of the contacts of the sockets and the individual contacts of the switches, and between the individual contacts of the switches and the terminals of the measuring devices.

JOSEPH L. ROEMISCH.